E. J. ROHNE.
ELECTRIC SWITCH.
APPLICATION FILED OCT. 1, 1917.
1,304,377. Patented May 20, 1919.
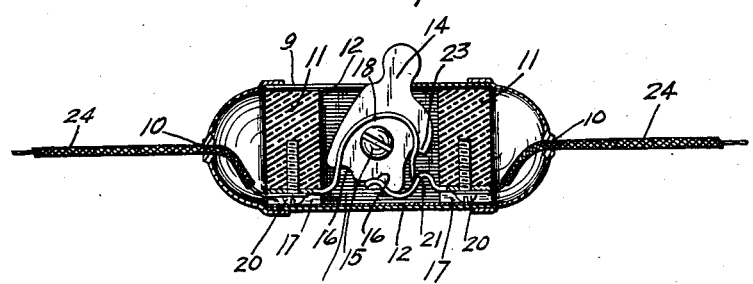
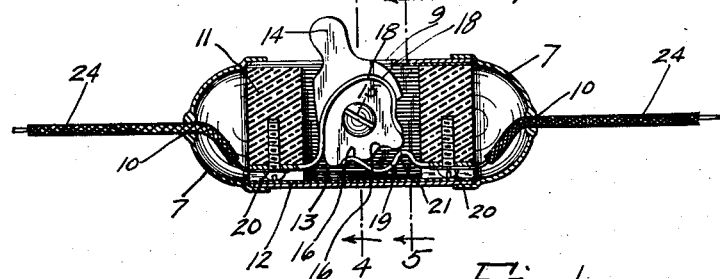
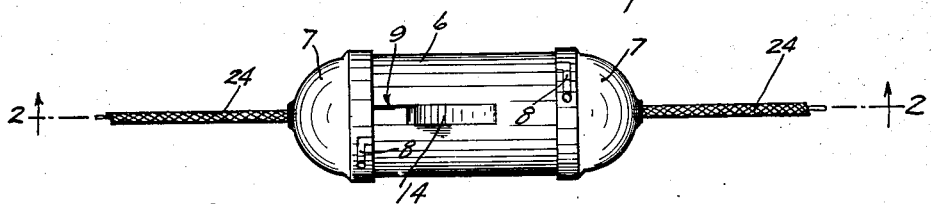
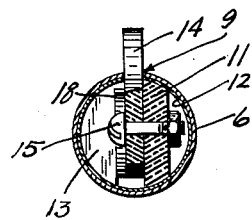 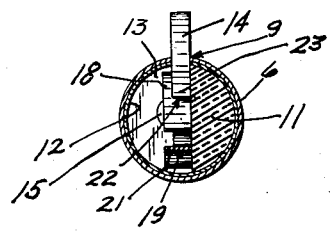
WITNESSES
E. C. Wells
H. L. Opsahl.
INVENTOR
Even J. Rohne
BY HIS ATTORNEYS
Williamson Merchant

UNITED STATES PATENT OFFICE.

EVEN J. ROHNE, OF MINNEAPOLIS, MINNESOTA.

ELECTRIC SWITCH.

1,304,377.  Specification of Letters Patent.  Patented May 20, 1919.

Application filed October 1, 1917. Serial No. 194,170.

*To all whom it may concern:*

Be it known that I, EVEN J. ROHNE, a citizen of the United States, residing at Minneapolis, in the county of Hennepin and State of Minnesota, have invented certain new and useful Improvements in Electric Switches; and I do hereby declare the following to be a full, clear, and exact description of the invention, such as will enable others skilled in the art to which it appertains to make and use the same.

My invention has for its object to provide an extremely simple and highly efficient electric switch of the "cut-off" type; and, to this end, it consists of the novel devices and combinations of devices hereinafter described and defined in the claims.

In the accompanying drawings, which illustrate the invention, like characters indicate like parts throughout the several views.

Referring to the drawings:

Figure 1 is an outside elevation of the improved switch;

Fig. 2 is a longitudinal central section taken on the line 2—2 of Fig. 1;

Fig. 3 is a view corresponding to Fig. 2 with the exception that the switch is shown in an open position;

Fig. 4 is a transverse section taken on the line 4—4 of Fig. 3; and

Fig. 5 is a transverse section taken on the line 5—5 of Fig. 3.

The numeral 6 indicates a cylindrical metal shell having removable concavo-convex ends 7 that are telescoped thereon and interlocked therewith by bayonet joints 8. A relatively long slot 9 is cut in the shell 6, from one end thereof, and each shell end 7 is provided with an axial cord opening 10. Removably inserted into the shell 6, by an axial sliding movement, is a core 11 that is covered by a thin tubing 12, said shell and tubing being of suitable insulating material.

In one side of the core 11 is cut, or otherwise formed, a recess 13 to receive a diametrically extended switch lever 14 made from wood fiber, or other suitable insulating material. As shown, this switch lever 14 is comparatively wide and pivoted to the core 13 by a nut-equipped bolt 15 for movement longitudinally thereof. The long end of the switch lever 14 projects through the slot 9 so that the same may be easily operated to move the same into either a switch open or a switch closed position. Formed in the wide short end of the switch lever 14 is a pair of curved notches 16 axially spaced with respect to the shell 6.

A pair of grooves 17 substantially alined with the short end of the switch lever 14 are formed in the periphery of the core 11 and extend from the ends thereof into the recess 13. Flat coöperating spring contact fingers 18 and 19 are secured by binding screws 20 in the grooves 17, and project into the recess 13, the one above the other, on opposite sides of the pivot 15. It will be noted that the contact finger 18 is widened near its free end to form a shoulder 22 which engages an undercut shoulder in the opposite edge of the switch lever 14 from the fixed end of the contact finger 18. This contact finger 18 is under strain to move into a switch open position, and carry the switch lever 14 therewith and its free end is made relatively sharp for a purpose that will presently appear.

The contact finger 19 is under strain to move toward the contact finger 18 with its free end yieldingly pressing upon the short end of the switch lever 14 so as to enter either one of the notches 16, with considerable force, and thereby yieldingly hold said switch lever 14 in either a switch open or a switch closed position. At its intermediate portion the contact finger 19 is bent toward the contact finger 18 to form a curved surface 21 with which the sharp end of said contact finger 18 engages with a scraping action.

The formation of the surface 21 on the contact finger 19 is such that from the time the same is engaged by the sharp end of the contact finger 18, until the switch lever 14 is locked in a switch closed position, a constant, strong and clean contact between said fingers is insured. During each movement of the contact finger 18, the surface 21 of the contact finger 19 is scraped by the sharp end of said contact finger 18, and thereby automatically kept clean and bright.

By keeping the contact surfaces of the contact fingers 18 and 19 clean sparks are eliminated, during the movement of said contact fingers to and from a switch closed position, and a switch with a quick snap action is insured. In providing a pair of spring contact fingers that yieldingly oppose one another when in switch closed position, wear between the engaging surfaces thereof is constantly taken up.

Electric cords 24 are extended through the axial openings 10 in the shell ends 7 and directly connected to the contact fingers 18 and 19 by binding screws 20.

The above described electric switch is very compact, light and of comparatively small cost to manufacture and easy to assemble, with few parts to get out of order and has a very quick make and break action.

What I claim is:

1. An electric switch comprising a cylindrical metal casing having removable ends with axial cord openings, a recess insulating core completely filling the body of the casing, a pair of contacts mounted in the recess of the core and attached thereto, a switch lever pivoted to the core for moving the contacts into switch open and switch closed positions, and electric cords extended through the cord openings in the ends of the casing and attached to the contacts.

2. An electric switch comprising a cylindrical metal casing having removable ends with axial cord openings, a recess insulating core completely filling the body of the casing, a pair of contacts mounted in the recess of the core and attached thereto, a switch lever pivoted to the core for moving the contacts into switch open and switch closed positions and extending through a slot in one end of the casing, said core and switch lever being removable from the casing by an axial movement of the core, and electric cords extended through the cord openings in the ends of the casing and attached to the contacts.

3. An electric switch, including two flat spring contacts, the free ends of which are in overlapped relation, an intermediately pivoted switch lever having a pair of notches, one of said contacts adapted to be moved by said lever into engagement with the other thereof, and under strain to move into a switch open position and to carry the switch lever therewith, while the other of said contacts is arranged to alternately engage said two notches in the switch lever and yieldingly hold the same in either a switch open or a switch closed position.

4. An electric switch including two normally separated spring contacts, a switch lever having a shoulder adapted to engage one of said contacts and move the same into engagement with the other of said contacts, said other contact arranged to yieldingly hold the lever in a switch closed position.

5. An electric switch including two normally separated spring contacts, a switch lever having a shoulder adapted to engage one of said contacts and move the same into engagement with the other of said contacts, said other contact arranged to yieldingly hold the lever in either a switch open or closed position.

6. An electric switch including two normally separated spring contacts extending, the one above the other, a switch lever pivoted between said two contacts and having a shoulder adapted to engage and move one of said contacts into engagement with the other of said contacts, said other contact arranged to yieldingly hold the lever in a switch closed position.

7. An electric switch including two normally separated spring contacts extending, the one above the other, one of said contacts having a raised intermediate portion with which the free end of the other of said contacts engages by a scraping action during the switch closing movement, and a switch lever adapted to move the last noted contact into the raised intermediate portion of said first noted contact and said last noted contact having its free end in engagement with the switch to yieldingly hold the same in a switch closed position.

8. An electric switch including two normally separated spring contacts extending, the one above the other, one of said contacts having a raised intermediate portion with which the free end of the other of said contacts engages by a scraping action during the switch closing movement, and a switch lever pivoted between said two contacts and having a shoulder and two lock notches, said shoulder arranged to engage the last noted contact during the switch closing position of the lever and move the same into engagement with the raised intermediate portion of the first noted lever, the free end of said first noted lever arranged to alternately engage said lock notch and hold the lever in either of its extreme positions.

In testimony whereof I affix my signature in presence of two witnesses.

EVEN J. ROHNE.

Witnesses:
CLARA DEMAREST,
HARRY D. KILGORE.